United States Patent
Ganesan et al.

(10) Patent No.: US 10,410,018 B2
(45) Date of Patent: Sep. 10, 2019

(54) CRYPTOGRAPHIC ASSURANCES OF DATA INTEGRITY FOR DATA CROSSING TRUST BOUNDARIES

(71) Applicant: PeerNova, Inc., San Jose, CA (US)

(72) Inventors: Gangesh Kumar Ganesan, Mountain View, CA (US); David John Hudson, Bangor (GB); Kevin Michael Gee, Redwood City, CA (US)

(73) Assignee: PeerNova, Inc., San Jose, CA (US)

( * ) Notice: Subject to any disclaimer, the term of this patent is extended or adjusted under 35 U.S.C. 154(b) by 174 days.

(21) Appl. No.: 15/186,276

(22) Filed: Jun. 17, 2016

(65) Prior Publication Data

US 2016/0379013 A1    Dec. 29, 2016

Related U.S. Application Data

(60) Provisional application No. 62/186,266, filed on Jun. 29, 2015.

(51) Int. Cl.
| | |
|---|---|
| G06F 21/00 | (2013.01) |
| G06F 21/64 | (2013.01) |
| H04L 9/32 | (2006.01) |

(52) U.S. Cl.
CPC .......... *G06F 21/645* (2013.01); *H04L 9/3247* (2013.01); *H04L 2209/56* (2013.01)

(58) Field of Classification Search
None
See application file for complete search history.

(56) References Cited

U.S. PATENT DOCUMENTS

| 6,079,018 A | * | 6/2000 | Hardy | ................... H04L 9/0891 380/46 |
|---|---|---|---|---|
| 2010/0185847 A1 | | 7/2010 | Shasha et al. | |
| 2011/0208947 A1 | | 8/2011 | Lin et al. | |
| 2012/0221421 A1 | | 8/2012 | Hammad | |

(Continued)

OTHER PUBLICATIONS

PCT International Search Report, PCT Application No. PCT/US16/38227, dated Feb. 17, 2017, 13 pages.

(Continued)

*Primary Examiner* — Andrew J Steinle
(74) *Attorney, Agent, or Firm* — Fenwick & West LLP

(57) ABSTRACT

A data integrity system generates a transaction signature associated with a transaction based on transaction data received from a data producer. The transaction signature is unique to the transaction and is generated by applying a hash function to the transaction data. When the transaction data is to be transmitted to a data consumer, the data integrity system redacts the transaction data based on permission information associated with the data consumer and transmits the redacted transaction data to the data consumer. To enable the data consumer to verify the integrity of the received data, the data integrity system also transmits a cryptographic assurance that includes at least the transaction signature associated with the transaction. The data consumer verifies the integrity of the received data by independently generating a transaction signature based on the redacted transaction data and matching the independently generated signature with the transaction signature in the cryptographic assurance.

20 Claims, 7 Drawing Sheets

(56) References Cited

U.S. PATENT DOCUMENTS

2014/0188675 A1\* 7/2014 Brown ................... G06Q 40/12
                                                705/30
2014/0189359 A1\* 7/2014 Marien ................. H04L 9/3228
                                                713/172

OTHER PUBLICATIONS

Extended European Search Report, European Patent Application No. 16830984.7, Nov. 29, 2018, 6 pages.

\* cited by examiner

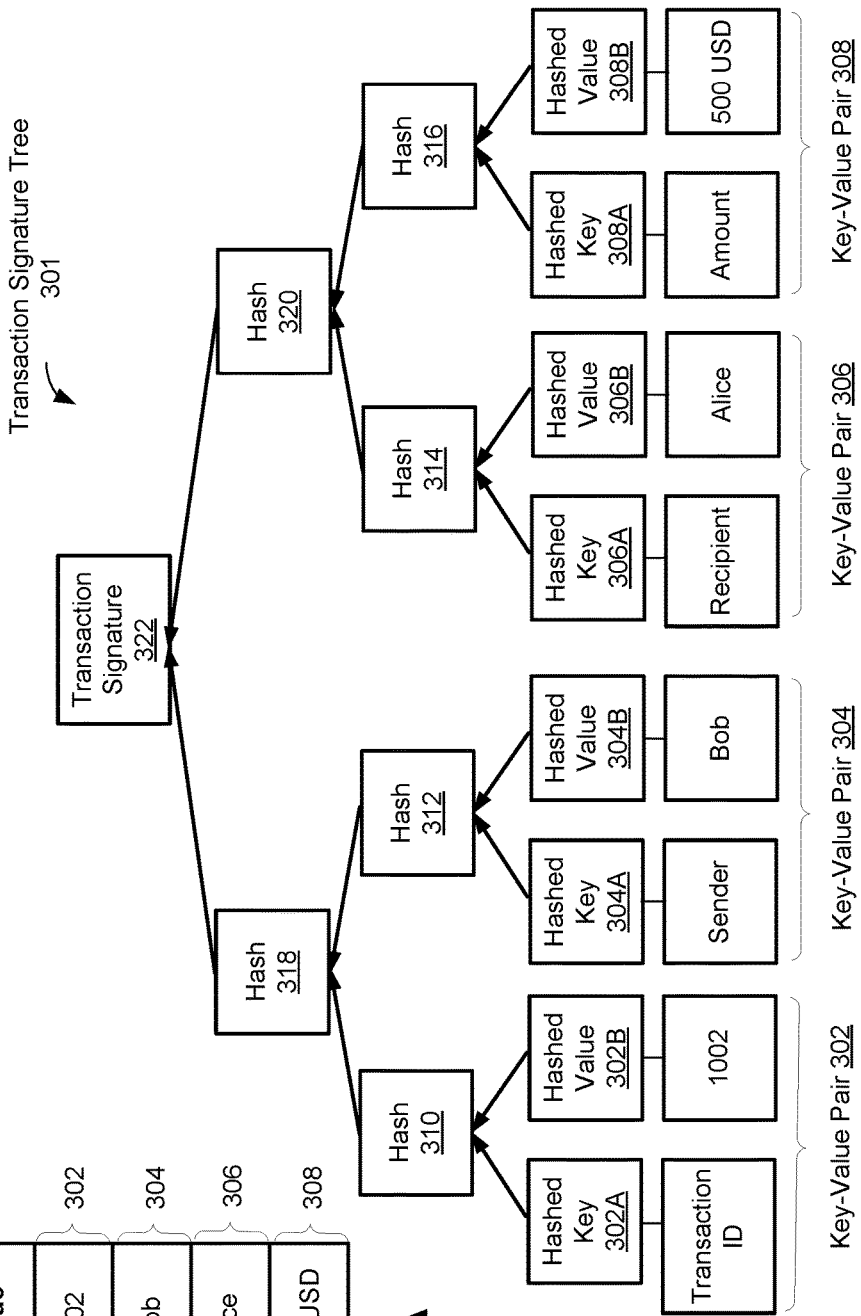

CRYPTOGRAPHIC ASSURANCES OF DATA INTEGRITY FOR DATA CROSSING TRUST BOUNDARIES

CROSS REFERENCE TO RELATED APPLICATION

This application claims the benefit of U.S. Provisional Patent Application No. 62/186,266, filed on Jun. 29, 2015, which is incorporated by reference herein in its entirety.

BACKGROUND

1. Field of Art

The present disclosure generally pertains to the storage of data and in particular to providing cryptographic assurances of data integrity for data crossing trust boundaries.

2. Description of the Related Art

Data is often exchanged between disparate systems across trust boundaries. A trust boundary represents a logical perimeter between systems that do not automatically trust data being transferred over the boundary. The data produced by one system should be immutable such that the receiving system can trust that the integrity of the data has been maintained and the data has not changed over time. As an example, banking records relating to banking transactions should be immutable because any changes to the records (e.g., by an unauthorized party) can cause account balances to be inaccurate. Thus, there is a need to be able to detect when data that should have been immutable is modified and thus its integrity cannot be verified.

SUMMARY

In one embodiment, when a data integrity system receives transaction data from a data producer, the data integrity system generates a transaction signature associated with the transaction based on the received transaction data. The transaction signature is unique to the transaction and is generated by applying a hash function to the transaction data. In operation, the data integrity system extracts key-value pairs from the transaction data and individually applies the hash function to the key-value pairs. The data integrity system then combines the hashed key-value pairs and applies the hash function to the combined hashes to generate intermediary hashes. The data integrity system iteratively performs this combination and hash function application mechanism to generate a signature tree. The master or root node of the signature tree is the transaction signature.

When the transaction data is to be transmitted to a data consumer, the data integrity system redacts the key-value pairs for which the data consumer does not have permission to view in unencrypted form. The value portion of a redacted key-value pair is encrypted according to the same hash function used to generate the transaction signature associated with the transaction. The data integrity system transmits the redacted key-value pairs and any unencrypted key-value pairs that the data consumer has permission to view in unencrypted form. To enable the data consumer to verify the integrity of the received data, the data integrity system also transmits a cryptographic assurance that includes at least the transaction signature associated with the transaction.

The data consumer verifies the integrity of the received data by independently generating a transaction signature based on the redacted key-value pairs and any unencrypted key-value pairs. When the independently generated transaction signature matches the transaction signature included in the cryptographic assurance, the data consumer may gain assurances of the integrity of the received data. When the independently generated transaction signature does not match the transaction signature included in the cryptographic assurance, the integrity of the received data cannot be verified.

In such a manner, transaction data originating from the data producer is transmitted to the data consumer via the data integrity system that allows the data consumer to verify the integrity of the data using the transaction signatures. Enabling the data consumer to verify the integrity of the data even when the data is redacted advantageously allows the data consumer to gain assurances regarding the integrity of the data even with the data consumer does not have the permission to view the data in unencrypted form.

In one embodiment, a computer implemented method comprises storing transaction data associated with a transaction. The transaction data is stored as a set of key-value pairs corresponding to data elements of the transaction data. The method further comprises applying a hash function to the set of key-value pairs to generate a transaction signature uniquely associated with the transaction, redacting one or more of the set of key-value pairs, and transmitting the redacted one or more of the key-value pairs, remaining ones of the key-value pairs, and the transaction signature to a second computer system for verification.

In another embodiment, a computer readable storage medium stores instructions that, when executed by a processor, cause the processor to store transaction data associated with a transaction. The transaction data is stored as a set of key-value pairs corresponding to data elements of the transaction data. The instructions further cause the processor to apply a hash function to the set of key-value pairs to generate a transaction signature uniquely associated with the transaction, redact one or more of the set of key-value pairs, and transmit the redacted one or more of the key-value pairs, remaining ones of the key-value pairs, and the transaction signature to a second computer system for verification.

In another embodiment, a computer implemented method comprises receiving a set of redacted key-value pairs corresponding to data elements of a transaction. The received set of redacted key-value pairs are in encrypted form. The method also comprises receiving a transaction signature uniquely associated with the transaction and generated based on the data elements and a hash function, applying the hash function to the set of redacted key-value pairs to generate a second transaction signature, and comparing the second transaction signature and the received transaction signature to verify the set of redacted key-value pairs.

BRIEF DESCRIPTION OF DRAWINGS

FIG. 3A illustrates an example of transaction data received from data producer and stored in the transaction data store in accordance with an embodiment.

FIG. 3B illustrates an example of a transaction signature tree generated based on the transaction data of FIG. 3A in accordance with an embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
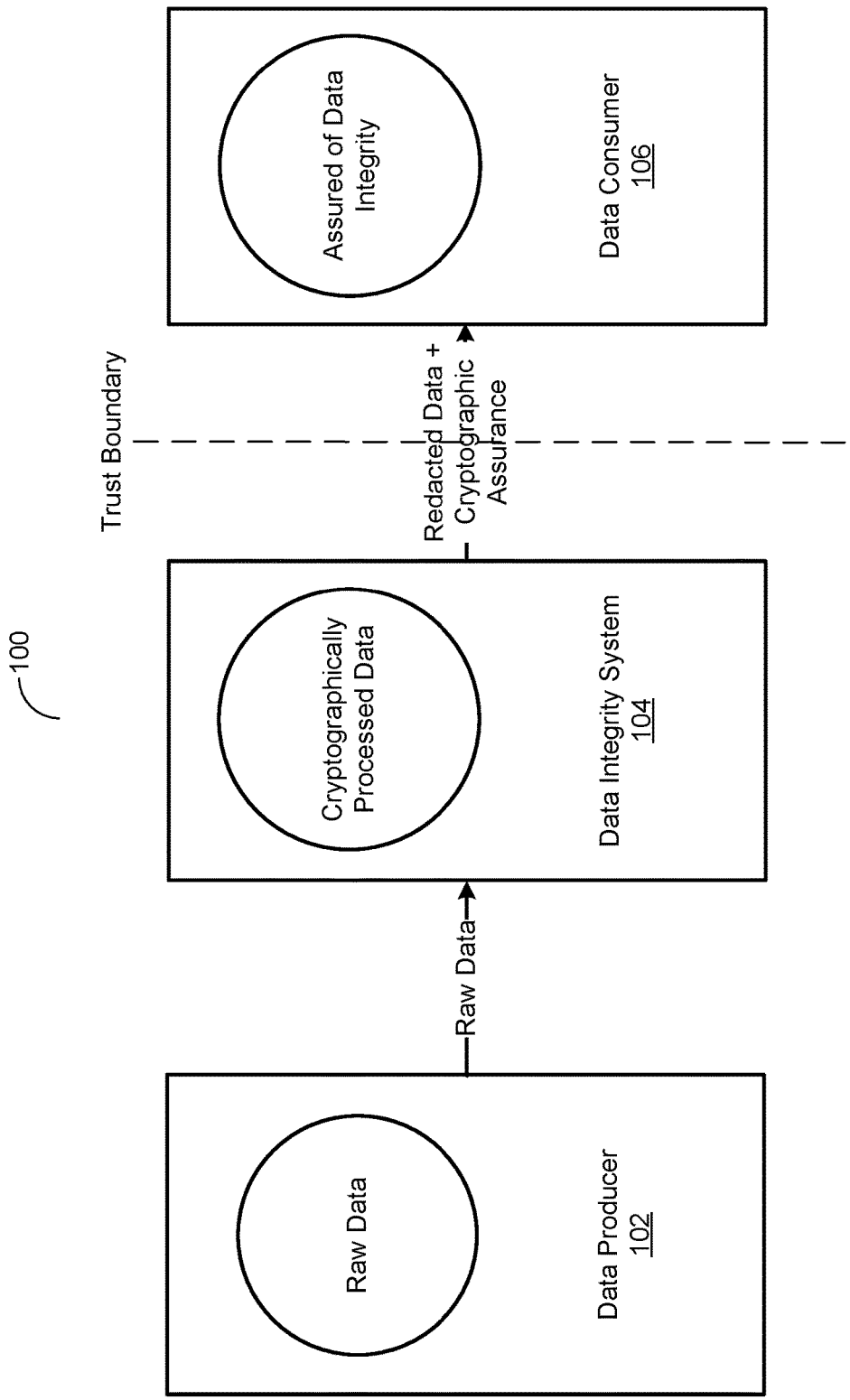
FIG. 1 is an environment for sharing data across a trust boundary in accordance with one embodiment.

FIG. 1 is an environment 100 for sharing data across a trust boundary in accordance with one embodiment. As shown, the environment 100 includes a data producer 102, a data integrity system 104, and a data consumer 106. Although the illustrated environment 100 includes only a select number of each entity, other embodiments can include more or less of each entity.

The data producer 102, data integrity system 104, and data consumer 106 may be implemented as computer systems. The data producer 102, data integrity system 104, and data consumer 106 communicate over a network (not shown in FIG. 1). In one embodiment, the network is the Internet and uses standard communications technologies and/or protocols. The network may also utilize dedicated, custom, or private communications links that are not necessarily part of the Internet. The network may comprise any combination of local area and/or wide area networks, using both wired and wireless communication systems. In one embodiment, information exchanged via the network is cryptographically encrypted and decrypted using cryptographic keys of the senders and the intended recipients.

The data producer 102 produces transaction data based on events occurring in transactional systems associated with the data producer. The events may include stock market transactions, banking transactions, shopping transactions, or any other transaction that require cryptographic, immutable storage of the transaction data. In one embodiment, for each event in an associated transactional system, the data producer 102 transmits raw transaction data to the data integrity system 104.

The data integrity system 104 receives, cryptographically processes, and stores transaction data received from the data producer 102. The data stored by the data integrity system 104 is intended to be immutable thus maintaining the integrity of the data. In particular, to maintain data integrity, the data integrity system 104 generates signatures associated with the data such that any changes to the stored data can be detected.

The data integrity system 104 also acts as a layer between the data producer 102 and the data consumer 106 for transmitting data across the trust boundary. The trust boundary represents a logical perimeter between systems that do not inherently trust data being transferred over the boundary. To account for this lack of trust, the data integrity system 104 transmits cryptographic assurances accompanying any data crossing over the trust boundary. The cryptographic assurances enable the data consumer 106 to verify the integrity of the received data. The cryptographic assurances are generated based on the signatures associated with the data. Further, in some cases, the data consumer 106 often does not have permissions to view some or all of the transaction data produced by the data producer 102. To account for the limited permissions, the data integrity system 104 redacts the transaction data according to the permissions prior to transmitting the data to the data consumer 106. Even when the data is redacted, the data consumer 106 is able to verify the integrity of the data based on the accompanying cryptographic assurances.

The following discussion provides details of (1) generating cryptographic signatures for transaction data produced by the data producer 102 and (2) redacting the transaction data for transmission to the data consumer 106 and providing cryptographic assurances regarding the integrity of the data.

Figure 2:
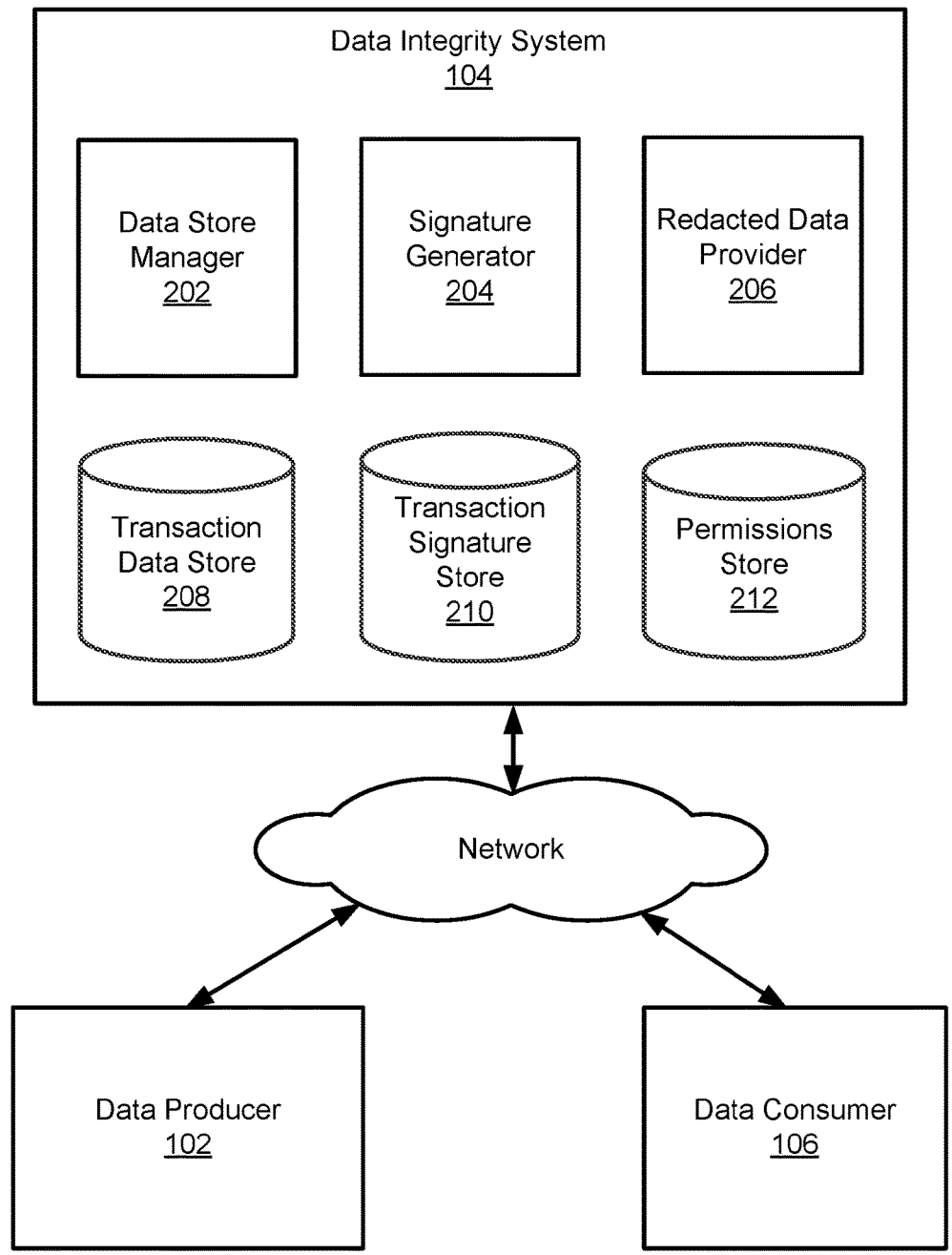
FIG. 2 is a detailed view of the data integrity system in accordance with one embodiment.

FIG. 2 is a detailed view of the data integrity system 104 in accordance with one embodiment. The data integrity system 104 includes a data store manager 202, a signature generator 204, a redacted data provider 206, a transaction data store 208, a transaction signature store 210, and a permissions store 212. The data integrity system 104 includes other hardware elements necessary for the operations described here, including network interfaces and protocols, input devices for data entry, and output devices for display, printing, or other presentations of data.

The data store manager 202, the signature generator 204, and the redacted data provider 206 are modules that execute on a computer. A "module" to refers to computer program instruction and other logic for providing a specified functionality. A module can be implemented in hardware, firmware, and/or software. A module can include one or more processes, and/or be provided by only part of a process. Embodiments of the data integrity system 104 may include other and/or different modules than the ones described here. In addition, the functionality attributed to the modules can be performed by other or different modules in other embodiments. Moreover, this description occasionally omits the term "module" for purposes of clarity and convenience.

The transaction data store 208, transaction signature store 210, and permissions store 212 are implemented using non-transitory computer readable storage devices, and suitable database management systems for data access and retrieval. In one embodiment, the transaction data store 208, transaction signature store 210, and/or permissions store 212 are implemented in a database management system, such as a relational database (e.g., MySQL). The transaction data store 208, transaction signature store 210, and permissions store 212 may be distributed from one another and/or remotely from the data integrity system 104.

Generating Cryptographic Signatures for Transaction Data

The data store manager 202 receives transaction data from data producers, e.g., data producer 102, and stores the transaction data in the transaction data store 208. The data store manager 202 stores the transaction data in the transaction data store 208 as key-value pairs. Specifically, the data store manager 202 extracts individual data elements or fields from the transaction data and separately stores those data elements in the transaction data store 208 in readable form, i.e., as received from the data producer 102. A data element stored by the transaction data store 208 may be, for example, a transaction, a document, or any other collection of related data. For example, for a banking transaction in which funds are transferred between two entities, the transaction may be broken down into data elements that include an identifier of transferring entity, an identifier of receiving entity, and an amount of the transfer.

Each stored data element is associated with a key, and the data element associated with the key is the value of a created key-value pair. The key may be used to query transaction data store 208 and retrieve the stored data element. Although the transaction data store 208 is described here as being a key-value data store, in other embodiments the transaction data store 208 may be any other type of database (e.g., a structured query language (SQL) database).

FIG. 3A illustrates an example of transaction data 300 received from data producer 102 and stored in the transaction data store 208 in accordance with an embodiment. The transaction data 300 represents a transaction involving a transfer of funds between "Alice" and "Bob." The data store manager 202, upon receiving raw transaction data representing the transaction, extracts the individual data elements from the raw data to generate key-value pairs 302-308. The key-value pair 302 has "Transaction ID" as its key and "1002" as its value. Similarly, the key-value pair 304 has "Sender" as its key and "Bob" as its value. The key-value pair 306 has "Recipient" as its key and "Alice" as its value. Finally, the key-value pair 308 has "Amount" as its key and "500 USD" as its value. The data store manager 202 stores the key-value pairs 302-308 in the transaction data store 208 in readable form.

Referring back to FIG. 2, the signature generator 204 generates a transaction signature for each transaction having associated transaction data stored in the transaction data store 208. A transaction signature uniquely identifies the transaction within the data integrity system 104. Furthermore, the mechanism for generating the transaction signature (discussed below) is tied to the transaction data. Therefore, any modifications to the transaction data occurring after the transaction signature has been generated can be detected based on the resulting mismatch between the transaction signature and the modified transaction data.

In operation, the signature generator 204 generates the transaction signature by individually applying a hash function to each key and value of a key-value pair associated with the transaction and stored in the transaction data store 208. The signature generator 204 combines the hash of the key and the hash of the value of a key-value pair and applies the hash function to the combination to generate a first level intermediary hash. The signature generator 204 then combines two or more intermediary hashes (generated from different key-value pairs) and applies the hash function to the combination to generate a second level intermediary hash. The signature generator 204 continues to hierarchically combine intermediary hashes and apply the hash function to the combinations until a master hash (also referred to as a "root hash") is generated when there are no more intermediary hashes to combine and encrypt by the hash function. The master hash is the transaction signature for the transaction. The hash function is a one-way function that makes it infeasible to recover the data element from the data signature. In one embodiment, the hash function applied is an SHA-256 (Secure Hash Algorithm-256) function. Since the transaction signature is created using the key-value pairs associated with the transaction, the transaction signature is unique to the transaction.

The signature generator 204 stores the hashes of the key-value pairs, the intermediary hashes, and the master hash associated with a given transaction in the transaction signature store 210. In one embodiment, the signature generator 204 stores the hashes of the key-value pairs, the intermediary hashes, and the master hash associated with a given transaction as a hash tree (also referred to herein as "transaction signature tree"). A transaction signature tree is a tree data structure in which every non-leaf node represents the hash of its child nodes and the leaf nodes represent the non-hashed data.

FIG. 3B illustrates an example of a transaction signature tree 301 generated based on the transaction data 300 in accordance with an embodiment. As shown, the leaf nodes of the transaction signature tree 301 represent the key-value pairs 302-308. The signature generator 204 applies a hash function to each key of the key-value pairs 302-308 to generate the hashed keys 302A, 304A, 306A, and 308A. Similarly, the signature generator 204 applies the function to each value of the key-value pairs 302-308 to generate the hashed values 302B, 304B, 306B, and 308B. The signature generator 204 then combines each pair of hashed key and value and applies the hash function to the combination to generate an intermediary hash. The signature generator 204 continues on to combine the intermediary hashes and applies the hash functions to the combinations until the transaction signature 322, i.e., the master hash, is generated.

In particular, the first level intermediary hash 310 is generated by applying the hash function to the combination of hashed key 302A and hashed value 302B, and the first level intermediary hash 312 is generated by applying the hash function to the combination of hashed key 304A and hashed value 304B. Similarly, the first level intermediary hash 314 is generated by applying the hash function to the combination of hashed key 306A and hashed value 306B, and the first level intermediary hash 316 is generated by applying the hash function to the combination of hashed key 308A and hashed value 308B. The signature generator 204 combines the first level intermediary hashes 310 and 312 and applies the hash function to the combination to generate the second level intermediary hash 318. Similarly, the signature generator 204 combines the first level intermediary hashes 314 and 316 and applies the hash function to the combination to generate the second level intermediary hash 320.

To generate the transaction signature 322, the signature generator 204 combines the second level intermediary hashes 318 and 320 and applies the hash function to the combination. In such a manner, the transaction signature 322 is generated based on every key-value pair in the transaction data 300. If any key-value pair is modified after the transaction signature 322 is generated, the transaction signature 322 will no longer be representative of the modified transaction data 300. As discussed below, this close coupling of the transaction signature 322 and the transaction data 300 enables the data integrity system 104 to maintain and provide assurances regarding the integrity of the transaction data 300.

Referring back to FIG. 2, the signature generator 204, in one embodiment, generates a sequence signature representing a given transaction based on the transaction signature associated with the transaction and a sequence signature associated with another related transaction. The related transaction may be linked to the given transaction based on chronology, the type of the transaction, and/or the data producer that transmitted the transaction data associated with the transaction. To generate the sequence signature representing the transaction, the signature generator 204 combines the transaction signature for the transaction with the sequence signature of the related transaction and applies the hash function to the combination. In such a manner, the signature generator 204 creates a chain of sequence signatures. Since each sequence signature in the chain is created based on the previously generated sequence signatures, the sequence signatures are cryptographically linked. The signature generator 204 stores the chain of sequence signatures in the transaction signature store 210.

Figure 4:
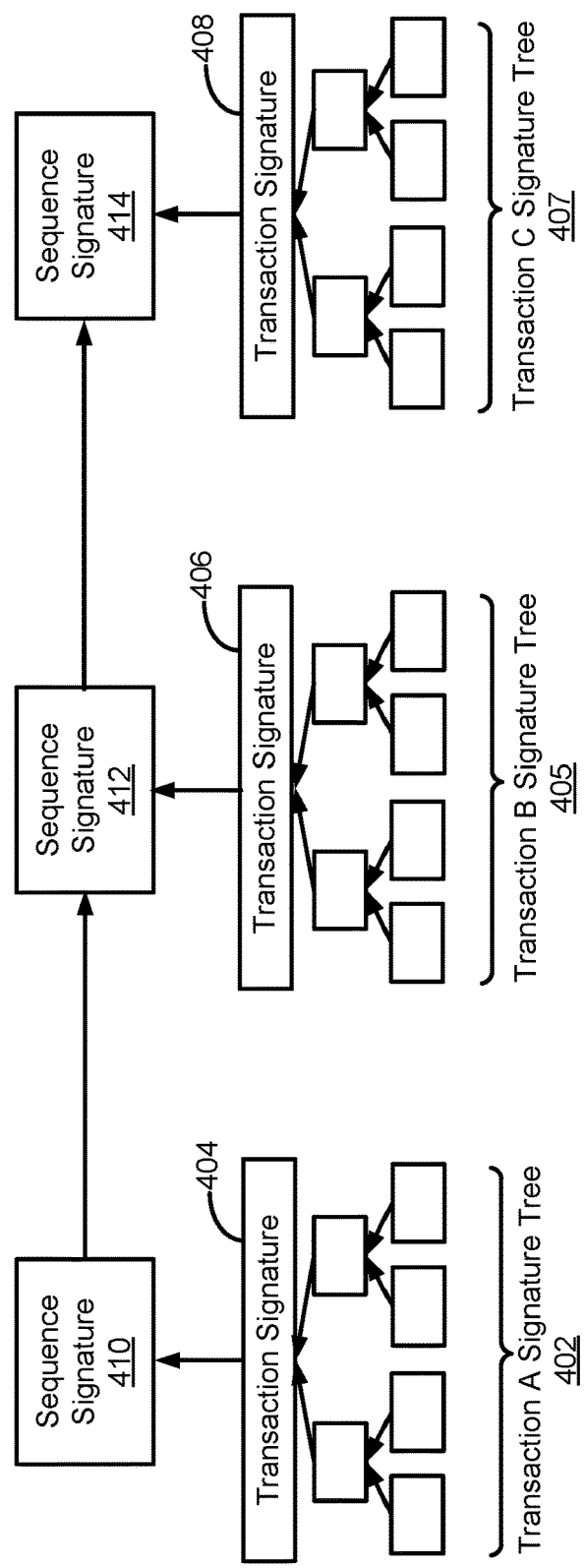
FIG. 4 illustrates example sequence signatures generated for transactions A, B, and C in accordance with an embodiment.

FIG. 4 illustrates example sequence signatures 410, 412, and 414 generated for transactions A, B, and C in accordance with an embodiment. Transaction A is associated with transaction A signature tree 402 generated by the signature generator 204. The master hash of transaction A signature tree 402 is the transaction signature 404 associated with transaction A. Similarly, transaction B is associated with transaction B signature tree 405 generated by the signature generator 204. The master hash of transaction B signature tree 405 is the transaction signature 406 associated with transaction B. Transaction C is associated with transaction C signature tree 407 generated by the signature generator 204. The master hash of transaction C signature tree 407 is the transaction signature 408 associated with transaction C.

The sequence generator 204 generates sequence signature 410 representing transaction A based on the transaction signature 404 associated with transaction A. In this example, sequence signature 410 is the first signature in the chain of sequence signatures stored in the transaction signature store 210. The sequence generator 204 generates sequence signature 412 representing transaction B by applying the hash function to the combination of the transaction signature 406 associated with transaction B and the previously created sequence signature 410. Similarly, the sequence generator 204 generates sequence signature 414 representing transaction C by applying the hash function to the combination of the transaction signature 408 associated with transaction C and the previously created sequence signature 412.

Because each sequence signature in the chain is generated based on a previous sequence signature and current transaction signature, the sequence signatures in the chain are cryptographically linked. Furthermore, if transaction data associated with any of the transactions represented by the chain is modified, the entire chain of sequence will no longer be representative of the transactions. This enables the data integrity system 104 to provide even greater assurances regarding the integrity of the transaction data, since any modification of transaction data impacts not only the signature of the associated transaction but all subsequent sequence signatures in the chain.

Providing Redacted Data and Cryptographic Assurances to Data Consumers

Referring back to FIG. 2, the redacted data provider 206 provides transaction data accompanied by cryptographic assurances regarding the integrity of the transaction data to the data consumer 106. Often times the data consumer 106 does not have permissions to receive or view the transaction data. In such cases, the redacted data provider 206 redacts the transaction data according to the permissions available to the data consumer 106. The accompanying cryptographic assurances transmitted by the redacted data provider 206 enable the data consumer 106 to verify the integrity of the redacted transaction data.

In operation, the redacted data provider 206 receives requests for transaction data associated with a given transaction or a set of transactions from the data consumer 106 (referred to herein as "the requested transaction data"). The request may identify the transactions based on transaction identifiers, the data producer 102 that transmitted the transaction data associated with the transactions, and/or the type of transaction. Responsive to receiving such a request, the redacted data provider 206 determines, based on permission information stored in the permissions store 212, the permissions available to the data consumer 106 to view the transaction data.

The permission information in the permission store 212 specifies which types of transaction data the data consumer 106 has permissions to view in an unencrypted form. The permission information may specify permissions at a high level of granularity, e.g., the set of data producers that produce transaction data which the data consumer 106 has permission to view and the types of transactions that the data consumer 106 has permission to view. The permission information may also specify permissions at a lower level of granularity, e.g., the particular key-value pairs in the transaction data that the data consumer 106 has permission to view. In one embodiment, the permission information is provided by the data producer 102 that transmits transaction data to the data integrity system 104.

The redacted data provider 206 determines, based on the permission information, the key-value pairs of the requested transaction data that the data consumer 106 has permission to view in an unencrypted form. If the data consumer 106 has permission to view all of the key-value pairs in an unencrypted form, then the redacted data provider 206 transmits all of the key-value pairs of the transaction data to the data consumer 106. If, however, the data consumer 106 does not have permission to view a given key-value pair in an unencrypted form, then the redacted data provider 206 redacts the key-value pair prior to transmitting the transaction data to the data consumer 106.

To redact a given key-value pair, the redacted data provider 206 replaces at least the value in the key-value pair with an encrypted form of the value. In operation, the redacted data provider 206 applies a hash function to the value in the key-value pair to generate its hash. The redacted data provider 206 replaces the value in the key-value pair with its hash to generate the redacted key-value pair. The redacted key-value pair is transmitted to the data consumer 106. The hash function used by the redacted data provider 206 is the same as the hash function used by the signature generator 204 to generate the transaction signature associated with the transaction data. In one embodiment, the redacted data provider 206 also replaces the key in the key-value pair with its hash.

Along with the transaction data (redacted or otherwise), the redacted data provider 206 also transmits a cryptographic assurance to the data consumer 106. The cryptographic assurance enables the data consumer to verify the integrity of the received data, more particularly that the data has not been modified since being stored in the data integrity system 104. The redacted data provider 206 generates the cryptographic assurance based on the transaction signature tree stored in the transaction signature store 210 and associated with the transaction for which the transaction data is being transmitted.

The cryptographic assurance includes at least the transaction signature associated with the transaction. The cryptographic assurance may optionally include the intermediary hashes stored in the transaction signature tree. In the embodiment where the signature generator 204 generates sequence signatures, the cryptographic assurance may also include the sequence signature chain representing the set of transactions including the transaction for which the transaction data is being transmitted. The transmitted sequence signature chain includes the sequence signature associated with the transaction and the sequence signature associated with at least one previous transaction that occurred prior to the transaction.

The data consumer 106 verifies the integrity of the transaction data (redacted or otherwise) by independently generating a transaction signature based on the received transaction data and comparing the generated transaction signature with the cryptographic assurance. The data consumer 106 uses the same mechanism for independently generating the transaction signature as the signature generator 204, i.e., applying the hash function to the key-value pairs, generating intermediary hashes, and generating the master hash. In the case of key-value pairs that are redacted, the data consumer 106 does not apply the hash function to the redacted keys and/or values as those are already hashed. When the independently generated transaction signature matches the transaction signature included in the cryptographic assurance, the data consumer 106 may gain assurances of the integrity of the data. In particular, the matching signatures indicate that the received transaction data is the same underlying data that was originally received from the data producer 102 and stored in the transaction data store 208.

When the independently generated transaction signature does not match the transaction signature included in the cryptographic assurance, the integrity of the received transaction data cannot be verified. The data consumer 106 may raise an alert with the data integrity system 104 or the data producer 102, indicating that the integrity of the data could not be verified. The data consumer 106 may also go a step further and compare the intermediary hashes in the cryptographic assurance with the independently generated intermediary hashes to determine which specific data elements were modified.

Figure 3C:
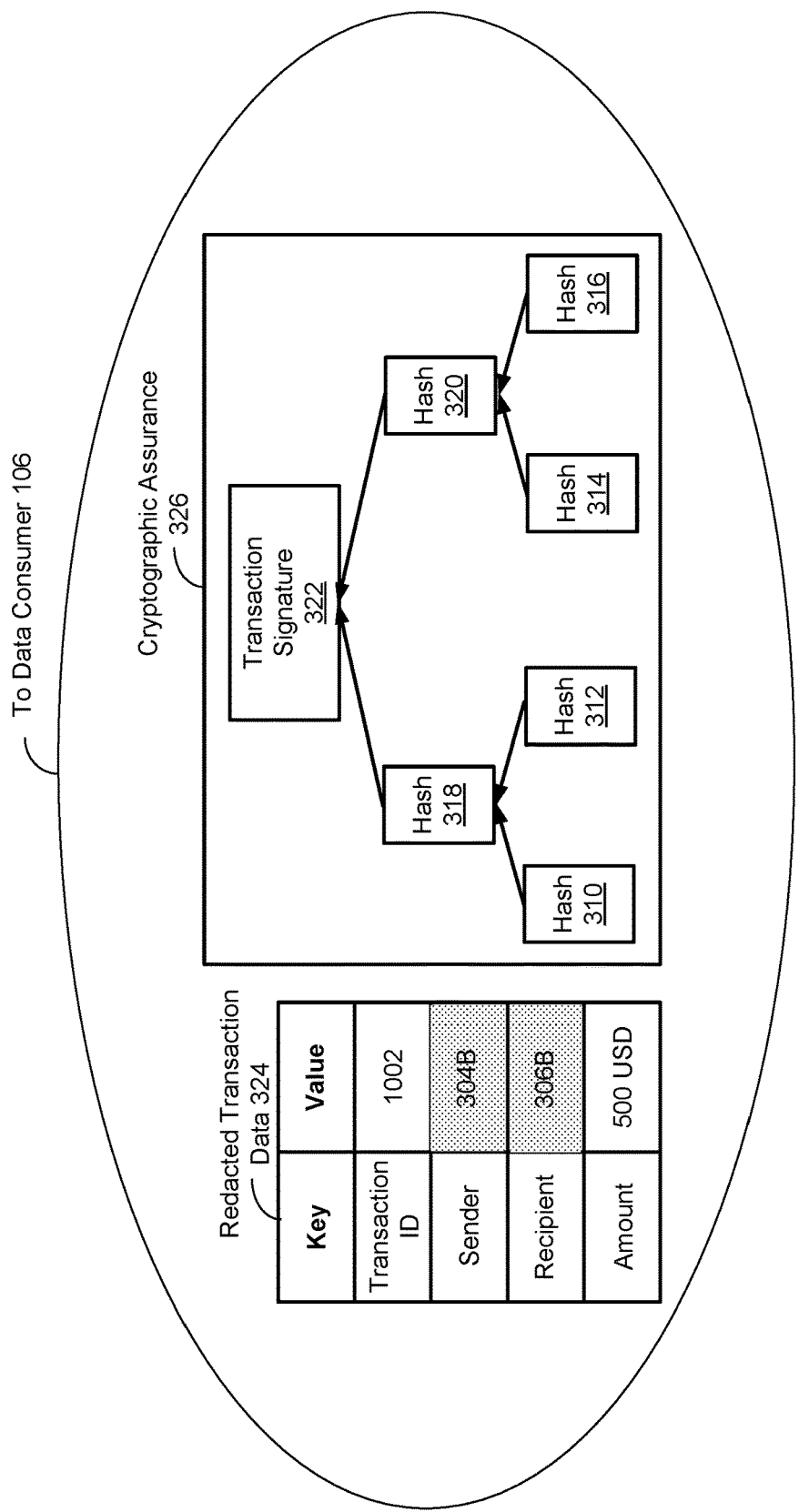
FIG. 3C illustrates an example of redacted transaction data and an accompanying cryptographic assurance transmitted to the data consumer in accordance with an embodiment.

FIG. 3C illustrates an example of redacted transaction data 324 and an accompanying cryptographic assurance 326 transmitted to the data consumer 106 in accordance with an embodiment. In the illustrated example, the transaction data being transmitted to the data consumer 106 is associated with the financial transaction of FIG. 3A. The redacted data provider 206 determines, based on the permission information associated with the data consumer 106, that any key-value pairs that provide information related to the identities of the participants of the transactions, i.e., Alice and Bob, cannot be viewed by the data consumer 106. Therefore, the redacted data provider 206 generates the redacted transaction data 324 that includes the hashes 304B and 306B in place of the values in the key-value pairs 304 and 306, respectively.

The redacted data provider 206 also generates the cryptographic assurance 326 for transmission to the data consumer 106. The cryptographic assurance 326 includes the transaction signature 322 associated with the transaction that was previously generated by the signature generator 204 and stored in the transaction signature store 210. In the illustrated embodiment, the cryptographic assurance 326 also includes the intermediary hashes 310-320 stored in the transaction signature tree 301.

The data consumer 106 verifies the integrity of the redacted transaction data 324 by independently generating a transaction signature based on the redacted transaction data 324 and comparing the generated transaction signature with the cryptographic assurance. When the independently generated transaction signature matches the transaction signature included in the cryptographic assurance, the data consumer 106 may gain assurances of the integrity of the redacted transaction data 324. When the independently generated transaction signature does not match the transaction signature included in the cryptographic assurance, the integrity of the redacted transaction data 324 cannot be verified.

Figure 5:
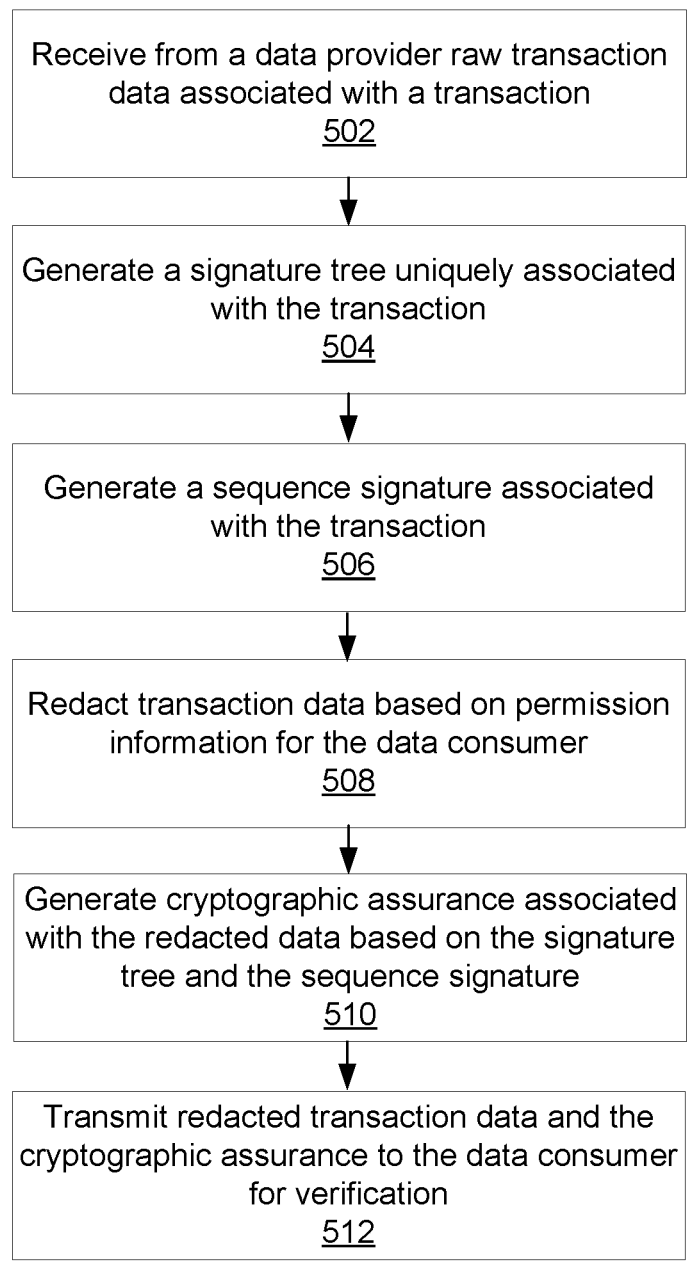
FIG. 5 is flow diagram illustrating a process for providing redacted data accompanied by a cryptographic assurance of data integrity to a data consumer in accordance with one embodiment.

FIG. 5 is flow diagram illustrating a process for providing redacted data accompanied by a cryptographic assurance of data integrity to a data consumer in accordance with one embodiment. The flow diagram illustrates the steps performed by the data integrity system 104. Those of skill in the art will recognize that other embodiments can perform the steps described for FIG. 5 in different order. Moreover, other embodiments can include different and/or additional steps than the ones described.

The data integrity system 104 receives 502 from a data producer raw transaction data associated with a transaction occurring within a system affiliated with the data producer. The transaction may be a financial transaction, such a stock purchase or a bank transfer. The data integrity system 104 generates 504 a signature tree that is uniquely associated with the transaction based on the transaction data. In particular, the data integrity system 104 generates key-value pairs from the data elements of the transaction data and individually applies the hash function to the key-value pairs. The data integrity system 104 then generates a hierarchy of intermediary hashes from the hashes of the key-value pairs until a master hash at the root node of the signature tree is generated. The master hash is the transaction signature associated with the transaction. The data integrity system 104 also generates 506 a sequence signature associated with the transaction. The sequence signature is generated based on the transaction signature associated with the transaction and a sequence signature associated with another related transaction.

The data integrity system 104 redacts 508 the transaction data associated with the transaction based on permission information stored in the permissions store 212 and associated with the data consumer. The permission information specifies the transaction data that the data consumer has permission to view in unencrypted form. To redact transaction data that the data consumer 106 does not have permission to view in unencrypted form, the data integrity system 104 replaces the value with its corresponding hashes.

The data integrity system 104 also generates 510 a cryptographic assurance associated with the redacted data based on the signature tree and the sequence signature associated with the transaction. The cryptographic assurance includes at least the transaction signature associated with the transaction. In some embodiments, the cryptographic assurance also includes the intermediary hashes stored in the signature tree and a sequence signature chain generated for a set of related transactions including the transaction for which data is being requested.

The data integrity system 104 transmits 512 the redacted transaction data and the cryptographic assurance to the data consumer for verification. The data consumer verifies the integrity of the redacted transaction data by independently generating a transaction signature based on the redacted transaction data and comparing the generated transaction signature with the cryptographic assurance. When the independently generated transaction signature matches the cryptographic assurance, the data consumer may gain assurances of the integrity of the redacted transaction data. When the independently generated transaction signature does not match the cryptographic assurance, the integrity of the redacted transaction data cannot be verified.

Figure 6:
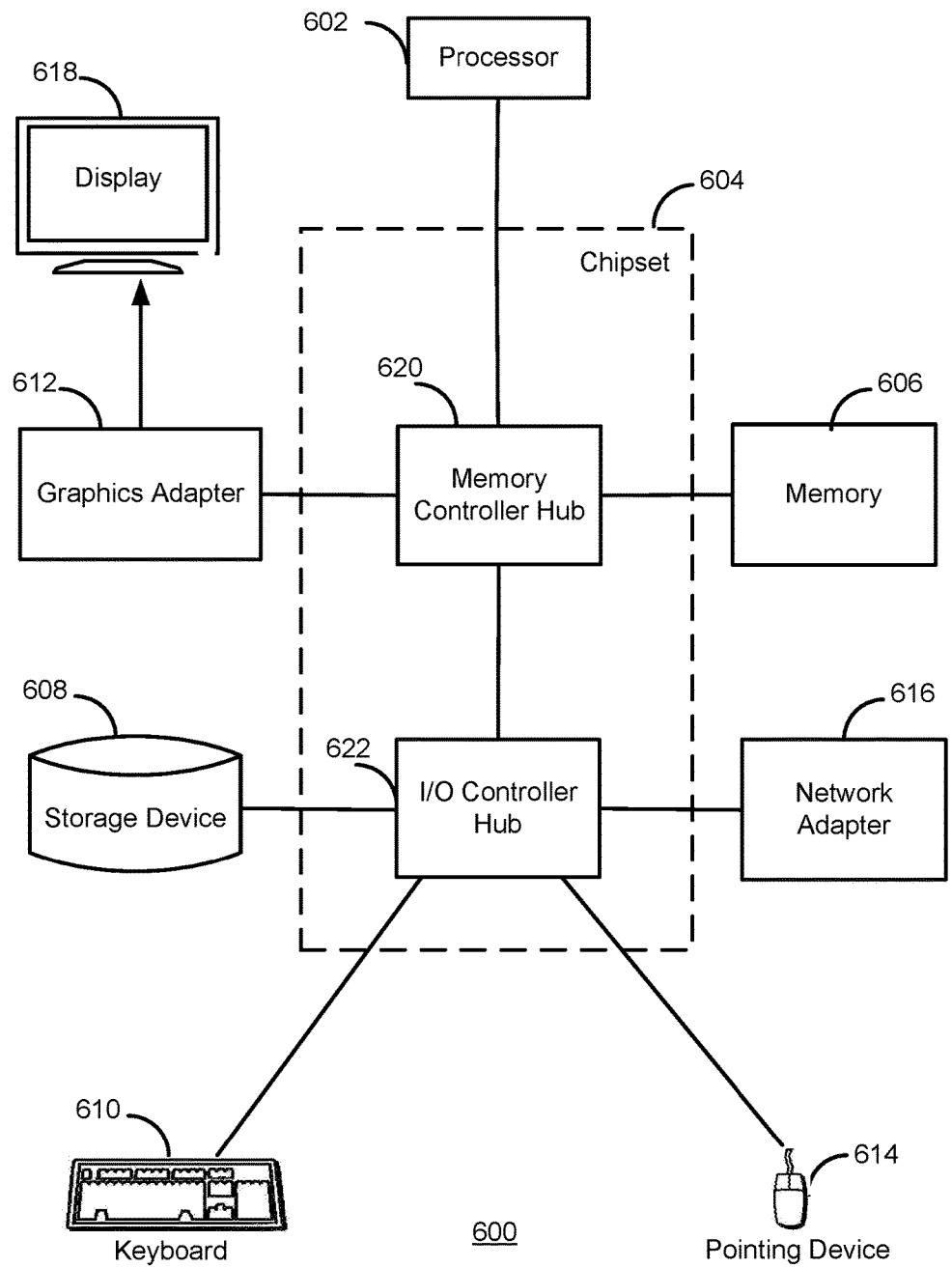
FIG. 6 is a block diagram illustrating a functional view of a typical computer system for use as one of the systems illustrated in the environment of FIG. 1 in accordance with one embodiment.

FIG. 6 is a block diagram illustrating a functional view of a typical computer system 600 for use as one of the systems illustrated in the environment 100 of FIG. 1 in accordance with one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network. Some embodiments of the computer system 600 have different and/or other components than those shown in FIG. 6.

The types of computer systems 600 used by the systems of FIG. 1 can vary depending upon the embodiment and the processing power used by the entity. Further, the foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented method comprising:
   storing, by a first computer system, transaction data associated with a transaction, the transaction data stored as a set of key-value pairs corresponding to data elements of the transaction data;
   applying, by the first computer system, a hash function to the set of key-value pairs to generate a transaction signature uniquely associated with the transaction;
   redacting, by the first computer system, a plurality of key-value pairs of the set of key-value pairs to generate a plurality of redacted key-value pairs by applying the hash function to the plurality of key-value pairs of the set of key-value pairs; and
   transmitting, by the first computer system, the plurality of redacted key-value pairs, remaining one or more of the key-value pairs that are not redacted, and the transaction signature to a second computer system for verification, such that the transaction signature is verifiable for the transaction data based on the plurality of redacted key-value pairs and the remaining one or more of the key-value pairs.

2. The method of claim 1, wherein the second computer systems verifies the transaction data responsive to the transmitted transaction signature matching another transaction signature generated in the second computer system from the plurality of redacted key-value pairs and the remaining one or more of the key-value pairs.

3. The method of claim 1, wherein applying the hash function to the set of key-value pairs comprises:
   individually applying the hash function to a key portion and a value portion of a first key-value pair to generate a first hashed key and a first hashed value; and
   applying the hash function to a combination of the first hashed key and the first hashed value to generate a first intermediary hash.

4. The method of claim 3, further comprising:
   individually applying the hash function to a key portion and a value portion of a second key-value pair to generate a second hashed key and a second hashed value; and
   applying the hash function to a combination of the second hashed key and the second hashed value to generate a second intermediary hash; and
   applying the hash function to a combination of the first intermediary hash and the second intermediary hash to generate the transaction signature.

5. The method of claim 3, further comprising transmitting the first intermediary hash to the second computer system, the transaction being further verified responsive to the transmitted first intermediary hash being equivalent to a second intermediary hash generated from a first redacted key-value pair.

6. The method of claim 1, wherein redacting the a plurality of key-value pairs of the set of key-value pairs comprises:
   applying the hash function to a value portion of a first key-value pair in the one or more of the set of key-value pairs to generate a hashed value; and
   replacing the value portion with the hashed value to generate a redacted key-value pair corresponding to the first key-value pair.

7. The method of claim 1, further comprising:
   applying a hash function to the transaction signature and another signature uniquely associated with another transaction data received prior to the received transaction data to generate a sequence signature; and
   transmitting the sequence signature and the another signature to the second computer system, the transaction being verified responsive to the transmitted sequence signature being equivalent to a second sequence signature generated in the second computer system from the another transaction signature and the another signature.

8. The method of claim 1, wherein the another transaction signature is generated by applying the hash function to the plurality of redacted key-value pairs and the remaining one or more of the key-value pairs.

9. A non-transitory computer readable medium storing instructions that, when executed by a processor, cause the processor to:
   store transaction data associated with a transaction, the transaction data stored as a set of key-value pairs corresponding to data elements of the transaction data;
   apply a hash function to the set of key-value pairs to generate a transaction signature uniquely associated with the transaction;
   redact a plurality of key-value pairs of the set of key-value pairs to generate a plurality of redacted key-value pairs by applying the hash function to the plurality of key-value pairs of the set of key-value pairs; and
   transmit the plurality of redacted key-value pairs, remaining one or more of the key-value pairs that are not redacted, and the transaction signature to a second computer system for verification, such that the transaction signature is verifiable for the transaction data based on the plurality of redacted key-value pairs and the remaining one or more of the key-value pairs.

10. The non-transitory computer readable medium of claim 9, wherein the second computer systems verifies the transaction data responsive to the transmitted transaction signature matching another transaction signature generated in the second computer system from the plurality of redacted key-value pairs and the remaining one or more of the key-value pairs.

11. The non-transitory computer readable medium of claim 9, wherein applying the hash function to the set of key-value pairs comprises:
   individually applying the hash function to a key portion and a value portion of a first key-value pair to generate a first hashed key and a first hashed value; and
   applying the hash function to a combination of the first hashed key and the first hashed value to generate a first intermediary hash.

12. The non-transitory computer readable medium of claim 11, the instructions further causing the processor to:
   individually apply the hash function to a key portion and a value portion of a second key-value pair to generate a second hashed key and a second hashed value; and
   apply the hash function to a combination of the second hashed key and the second hashed value to generate a second intermediary hash; and
   apply the hash function to a combination of the first intermediary hash and the second intermediary hash to generate the transaction signature.

13. The non-transitory computer readable medium of claim 11, the instructions further causing the processor to transmit the first intermediary hash to the second computer system, the transaction being further verified responsive to the transmitted first intermediary hash being equivalent to a second intermediary hash generated from a first redacted key-value pair.

14. The non-transitory computer readable medium of claim 9, wherein redacting the a plurality of key-value pairs of the set of key-value pairs comprises:
- applying the hash function to a value portion of a first key-value pair in the one or more of the set of key-value pairs to generate a hashed value; and
- replacing the value portion with the hashed value to generate a redacted key-value pair corresponding to the first key-value pair.

15. The non-transitory computer readable medium of claim 9, the instructions further causing the processor to:
- apply a hash function to the transaction signature and another signature uniquely associated with another transaction data received prior to the received transaction data to generate a sequence signature; and
- transmit the sequence signature and the another signature to the second computer system, the transaction being verified responsive to the transmitted sequence signature being equivalent to a second sequence signature generated in the second computer system from the another transaction signature and the another signature.

16. The non-transitory computer readable medium of claim 9, wherein the another transaction signature is generated by applying the hash function to the plurality of redacted key-value pairs and the remaining one or more of the key-value pairs.

17. A computer implemented method comprising:
- receiving a set of a plurality of redacted key-value pairs and a set of remaining one or more key-value pairs corresponding to data elements of a transaction, the set of redacted key-value pairs being in encrypted form;
- receiving a transaction signature uniquely associated with the transaction and generated based on the data elements and a hash function;
- applying the hash function to the set of redacted key-value pairs and the set of remaining key-value pairs to generate a second transaction signature; and
- comparing the second transaction signature and the received transaction signature to verify the set of redacted key-value pairs corresponds to the data elements of the transaction.

18. The method of claim 17, wherein applying the hash function to the set of redacted key-value pairs comprises:
- applying the hash function to a key portion of a first redacted key-value pair to generate a first hashed key; and
- applying the hash function to a combination of the first hashed key and a value portion of the first redacted hashed value to generate a first intermediary hash.

19. The method of claim 18, further comprising:
- applying the hash function to a key portion of a second redacted key-value pair to generate a second hashed key;
- applying the hash function to a combination of the second hashed key and a value portion of the second redacted hashed value to generate a second intermediary hash; and
- applying the hash function to a combination of the first intermediary hash and the second intermediary hash to generate the second transaction signature.

20. The method of claim 18, further comprising comparing the first intermediary hash with an intermediary hash received in association with the first redacted key-value pair to verify the first redacted key-value pair.

* * * * *